Nov. 16, 1937.  H. V. WODTKE  2,099,415
PROTECTIVE JACKET FOR CONDUCTORS OR CABLES
Filed April 17, 1934
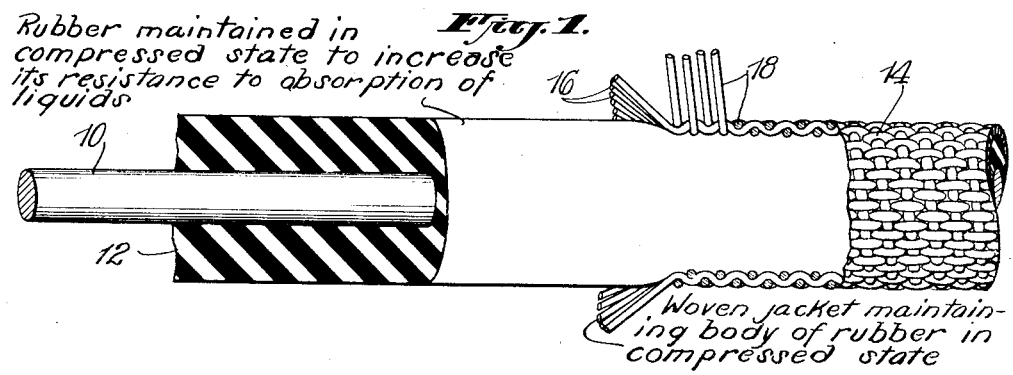
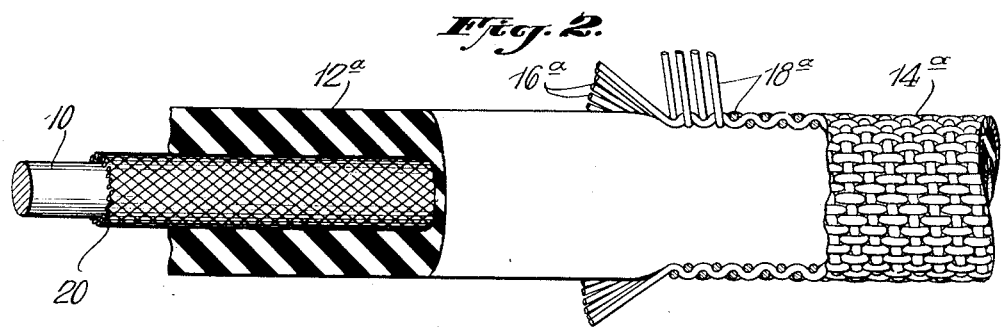
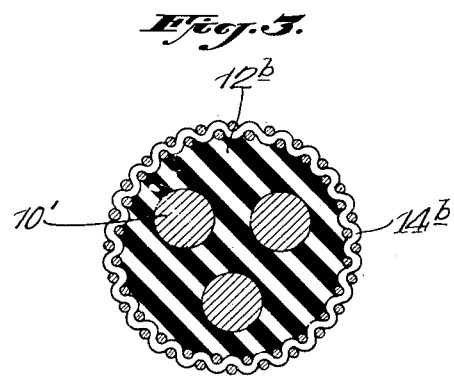
INVENTOR.
HANS V. WODTKE.
BY
ATTORNEYS Patented Nov. 16, 1937

2,099,415

UNITED STATES PATENT OFFICE 2,099,415

PROTECTIVE JACKET FOR CONDUCTORS OR CABLES

Hans V. Wodtke, Plainfield, N. J., assignor to Anaconda Wire & Cable Company, New York, N. Y., a corporation of Delaware Application April 17, 1934, Serial No. 720,963

3 Claims. (Cl. 173—264)

Heretofore the jackets covering cables or conductors have been saturated with various compounds and a finished braid or jacket having rubber compounded therewith has enclosed the insulated conductor. Saturated braids are not wholly satisfactory in practice, due to the fact that they are not homogeneous throughout. While in practice the saturated braids of the prior art are effective to resist mechanical wear, they are open to the objection that they permit the entrance of moisture after a continued exposure to the elements or to wet conditions in service. Where conductors are provided with a heavy outer coat of rubber, they are expensive and while they resist penetration by moisture when new, after a length of time in service the rubber tends to deteriorate. This permits rapid penetration of moisture. Or, where the conductor or cable is used in a location where it is exposed to grease, fats, lubricating oil and the like, the rubber soon becomes deteriorated to such an extent as to be rendered useless.

The present invention aims to overcome the shortcomings of prior practice and involves the provision of means for maintaining a body of rubber over a conductor in a compressed state by holding the rubber in such a compressed state that its resistance to the absorption of all liquids is greatly increased. I believe that I am the first to utilize and point out the advantages of holding a body of rubber in such a compressed state about a conductor or cable, or about the insulation thereof. The invention also contemplates a method of producing insulated conductors which involves applying a body of rubber about the conductor, then forming a tight fitting jacket about the rubber body and subsequently vulcanizing the rubber body. The process of vulcanization cements the fibrous cover to the layer of rubber and such cover is penetrated to an appreciable extent by the rubber during the vulcanization. I take advantage of the fact that rubber, upon vulcanization, has a tendency to flow or expand. Thus by tightly weaving a jacket over the rubber body and subsequently vulcanizing it, the resultant rubber body is maintained in a compressed condition about the conductor. I preferably form the enclosing jacket by circularly interweaving a multiplicity of longitudinally extending warp strands with a multiplicity of convolutions of helical filling strands. Such a circularly woven fabric is better able to withstand expanding forces than will a braid.

The woven outer cover may, after vulcanization of the rubber body, be saturated with materials conventionally used in this art, such as asphalt, stearin pitch, or the like, or it may have coatings of lacquer applied to the exterior thereof. The rubber body, when combined with the outer jacket which holds it constricted about the conductor, therefore, is better able to resist penetration by oil or water than it would be without the jacket. And the combination of the compressed body of rubber and the outer woven jacket has advantageous features not present in the ordinary type of conductor having an inert body of rubber surrounded by or bonded to an outer fibrous jacket.

The invention may be embodied in various cable or conductor assemblies. Merely by way of illustration, I have shown two alternative embodiments of the invention, in which—

Fig. 1 is a longitudinal view with parts broken away and shown in section wherein the rubber is applied over the conductor; Fig. 2 illustrates a modification in which the wire or conductor has applied thereto a braid impregnated with suitable insulating or weather-proofing substances over which there is a body of rubber held compressed by an outer jacket; Fig. 3 illustrates an alternative embodiment of the invention in which a plurality of conductors are surrounded by a body of rubber which is maintained in a compressed state by an outer jacket.

In the construction of Fig. 1, 10 represents either a cable or conductor having a body of rubber 12 applied thereto in an unvulcanized state and then subsequently encased in a jacket, indicated as a whole at 14, which jacket comprises a plurality of longitudinal warp strands 16 of fibrous material, such as cotton or the like. These strands are interwoven with a plurality of convolutions of helical filling strands 18 of cotton, twisted paper, or similar fibrous material, after which the assemblage is vulcanized, thus the jacket has a constricting influence on the body of rubber 12 and serves to maintain the latter in a compressed state.

In the modification of Fig. 2, the conductor 10 has a braid 20 formed thereabout, this braid being impregnated with asphalt, pitch, or other insulating or weather-proofing and protective substances known to those skilled in the art. About the impregnated braid there is applied a body of unvulcanized rubber 12a, which is enclosed in a jacket 14a composed of interwoven warp and filling strands. In this embodiment of the invention, it will also be understood that, after the rubber body is enclosed in the jacket, the same is vulcanized so as to maintain the rubber in a compressed state. In both embodiments of the invention, the over-all tensile strength of the conductor as a whole is augmented by reason of the strength of the straight longitudinal warp members which with the filling members 18 during the vulcanization become intimately cemented or bonded and unified with the underlying body of compressed rubber.

In the modification illustrated in Fig. 3, I have shown a plurality of conductors 10' surrounded by a body of rubber 12b, which in turn is covered with a jacket 14b vulcanized thereto so as to maintain the rubber in a state of compression.

The detailed description herein as well as the drawing are intended to be interpreted in an illustrative rather than a limiting sense and the claims are to be construed as broadly as is consistent with the state of the prior art.

What I claim is:—

1. A conductor having an outermost closely woven fibrous jacket and a body of rubber wholly enveloped and maintained in a state of compression about the conductor by said jacket so as to render the rubber body more highly resistant to the absorption of liquids than in would be if the herein recited elements were not so combined.

2. A conductor having an outermost jacket comprising a multiplicity of fibrous warp strands extending substantially parallel to the conductor and interwoven with weft strands disposed approximately at right angles to the conductor and a body of rubber maintained in a state of compression about the conductor by said jacket, so as to render the rubber body more highly resistant to the absorption of liquids than it would be if the herein recited elements were not so combined.

3. In the manufacture of insulated conductors, the method which comprises applying a body of rubber about the conductor, tightly weaving a multiplicity of warp strands and weft strands in such manner that the warp strands extend substantially parallel with the conductor and the weft strands extend approximately at right angles thereto and subsequently vulcanizing the assemblage, whereby the rubber body is maintained in a state of compression by the jacket so as to render said body more highly resistant to absorption of liquids than it would be if not so constructed.

HANS V. WODTKE.